(12) United States Patent
Atamer et al.

(10) Patent No.: US 11,926,048 B2
(45) Date of Patent: Mar. 12, 2024

(54) MODULAR ROBOTIC LINKAGES

(71) Applicant: Amazon Technologies, Inc., Seattle, WA (US)

(72) Inventors: Bertan Atamer, Shrewsbury, MA (US); Yuri Anatoly Ivanov, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/331,125

(22) Filed: May 26, 2021

(65) Prior Publication Data

US 2022/0379462 A1 Dec. 1, 2022

(51) Int. Cl.
   *B25J 9/00* (2006.01)

(52) U.S. Cl.
   CPC .................................. *B25J 9/0009* (2013.01)

(58) Field of Classification Search
   CPC ... B25J 9/0009; B25J 9/08; B25J 18/00; B25J 17/025; B25J 9/0024; B25J 9/046; B25J 9/047; B25J 9/1617; A63H 33/04; A63H 33/042; A63H 33/06; A63H 33/062; A63H 33/067
   USPC ...................................................... 74/490.01
   See application file for complete search history.

(56) References Cited

U.S. PATENT DOCUMENTS

| | | | | |
|---|---|---|---|---|
| 4,766,775 A | * | 8/1988 | Hodge | B25J 9/08 D15/199 |
| 5,293,107 A | * | 3/1994 | Akeel | B25J 19/0029 310/83 |
| 5,428,713 A | * | 6/1995 | Matsumaru | B25J 9/1615 700/262 |
| 5,523,662 A | * | 6/1996 | Goldenberg | B25J 17/025 901/23 |
| 5,963,712 A | * | 10/1999 | Fujita | B25J 9/1615 700/250 |
| 6,084,373 A | * | 7/2000 | Goldenberg | B25J 9/08 901/23 |
| 6,636,781 B1 | * | 10/2003 | Shen | B08B 9/045 703/2 |

(Continued)

FOREIGN PATENT DOCUMENTS

| | | | |
|---|---|---|---|
| CN | 102101290 A | * | 6/2011 |
| CN | 108638040 A | | 10/2018 |

(Continued)

OTHER PUBLICATIONS

GB2207539.4, "Combined Search and Examination Report", dated Nov. 15, 2022, 3 pages.
GB2207539.4, "Office Action", dated Jul. 12, 2023, 4 pages.

*Primary Examiner* — T. Scott Fix
(74) *Attorney, Agent, or Firm* — Kilpatrick Townsend & Stockton LLP (57) ABSTRACT

Modular components may be used to build a robotic manipulator. A subset of the modular components can be selected to build the robotic manipulator based on a schematic. The subset of modular components can be assembled in different combinations to build the robotic manipulator. Using one of the combinations of the subset of modular components, the robotic manipulator can be built.

16 Claims, 8 Drawing Sheets

(56) References Cited

U.S. PATENT DOCUMENTS

| | | | |
|---|---|---|---|
| 7,013,750 B1 * | 3/2006 | Kazami | B25J 9/08 901/29 |
| 8,666,547 B2 * | 3/2014 | Cheung | B25J 9/08 700/250 |
| 9,597,796 B2 * | 3/2017 | Rollinson | B25J 9/08 |
| 9,671,786 B2 * | 6/2017 | Baltes | G05D 1/0274 |
| 10,272,575 B2 * | 4/2019 | Pedersen | B25J 15/0483 |
| 10,710,238 B2 * | 7/2020 | Guo | B25J 9/08 |
| 11,198,225 B2 * | 12/2021 | Chen | B25J 9/0018 |
| 2012/0204670 A1 * | 8/2012 | Ryland | B25J 9/08 74/490.03 |
| 2014/0121803 A1 * | 5/2014 | Das | G05B 19/41845 700/100 |
| 2014/0222198 A1 * | 8/2014 | Emami | B25J 9/08 901/14 |
| 2016/0005331 A1 * | 1/2016 | Ryland | F16H 1/12 434/118 |
| 2017/0100844 A1 * | 4/2017 | Raak | B25J 9/08 |
| 2021/0162585 A1 | 6/2021 | Yang | |

FOREIGN PATENT DOCUMENTS

| | | | | |
|---|---|---|---|---|
| CN | 110434844 A | | 11/2019 | |
| DE | 4030119 A | * | 3/1992 | .......... B25J 17/0241 |
| DE | 202014101342 U1 | * | 5/2014 | ............. B25J 17/00 |
| DE | 102020103058 B3 | * | 7/2021 | ............. B25J 17/00 |
| EP | 743143 A1 | * | 11/1996 | ................ B25J 9/08 |
| EP | 3216569 A1 | * | 9/2017 | ................ B25J 9/08 |
| EP | 3372354 A1 | * | 9/2018 | |
| GB | 2533314 A | * | 6/2016 | .......... A63H 33/042 |
| KR | 100882920 B1 | * | 2/2009 | |
| KR | 100884274 B1 | * | 2/2009 | |
| WO | WO-9006546 A | * | 6/1990 | ................ B25J 9/08 |
| WO | WO-9006546 A1 | * | 6/1990 | ................ G05B 19/42 |
| WO | WO-9901261 A1 | * | 1/1999 | ................ B25J 9/08 |
| WO | WO-2008083489 A1 | * | 7/2008 | .......... G05D 1/0274 |
| WO | WO-2014137945 A1 | * | 9/2014 | ................ B25J 9/08 |
| WO | 2016088918 A1 | | 6/2016 | |
| WO | WO-2018040541 A1 | * | 3/2018 | ............. B25J 18/00 |
| WO | WO-2020121189 A1 | * | 6/2020 | .......... A63H 33/042 |
| WO | WO-2021013994 A1 | * | 1/2021 | .......... B25J 19/0029 |

* cited by examiner

MODULAR ROBOTIC LINKAGES

BACKGROUND

Many modern day industries are relying more and more on robotic manipulators. Such robotic manipulators may function to increase repeatability of tasks, increase efficiency of production lines, and bring other benefits to their operators. These benefits may be especially realized when the robotic manipulators are constructed to perform a specific task. For example, a custom robotic manipulator may be designed and constructed based on the task that needs to be completed. However, the design and construction of a robotic manipulator may be costly and time consuming.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a robotic manipulator system and techniques for assembling the robotic manipulator. Components (e.g., modular components) can be used to build different types or styles of robotic manipulators. The components can include different types of components for building the robotic manipulators. For example, the components can include linkages, connectors, and housings which can be assembled together to form various modules. A schematic can be used to select a specific type of robotic manipulator to be built. For example, a schematic can correspond to a robotic manipulator for grasping items. The schematic can identify modules and/or components which can be used to assemble the robotic manipulator. The schematic can also provide plans for how the modules and/or components can be combined to assemble the specified robotic manipulator. The modules can be combined in various combinations to form the robotic manipulator. In some examples, the modules can be modified. For example, some of the components that make up the modules can be replaced and/or the orientation of some or all of the components can be modified. In further examples, the components and/or modules used to build the robotic manipulator can be used to build another robotic manipulator. This second robotic manipulator can be built according to another combination of modules and/or components identified in the schematic. Additionally, or alternatively, the second robotic manipulator can be built using a second schematic which identifies different modules and/or components.

In some examples, the components can include electronics. The electronics can be used to actuate sections of the robotic manipulator and/or may be used to detect data associated with the robotic manipulator. For example, the electronics can include sensors, actuators, and/or processors which can be selected based on the schematic of the robotic manipulator. In further examples, the electronics can be used to determine how the components are being assembled to build the robotic manipulators. For example, the electronics can identify or determine the positions of the components relative to one another. The electronics can also include data about the individual components. For example, the data can include the mass or geometry of one or more of the components.

In a particular example, robotic manipulators can be assembled using components. The components available can be accessed to determine what parts are available for building the robotic manipulators. The components can be combinable in different combinations to build different types of modules which can be combined together and/or with other components to assemble various robotic modules. A schematic (e.g., a blueprint or design) of a robotic manipulator can be used to determine which modules and/or components can be used to build the robotic manipulator. The schematic can include one or more ways the modules and/or components can be combined to build the robotic manipulator. For example, the schematic can identify which modules and/or components can be used and how the components and/or modules can be coupled with one another to build the robotic manipulator. Some or all of the modules and/or components can be used to build the robotic manipulator based on a selected combination in the schematic. A second robotic manipulator can be built using the modular components. The second robotic manipulator can be built (i) using the same modules and/or components in a different combination identified in the schematic, (ii) using the same modules and/or components in a combination identified in a second schematic, and/or (iii) using a second schematic and a second set of modules and/or components.

Figure 1:
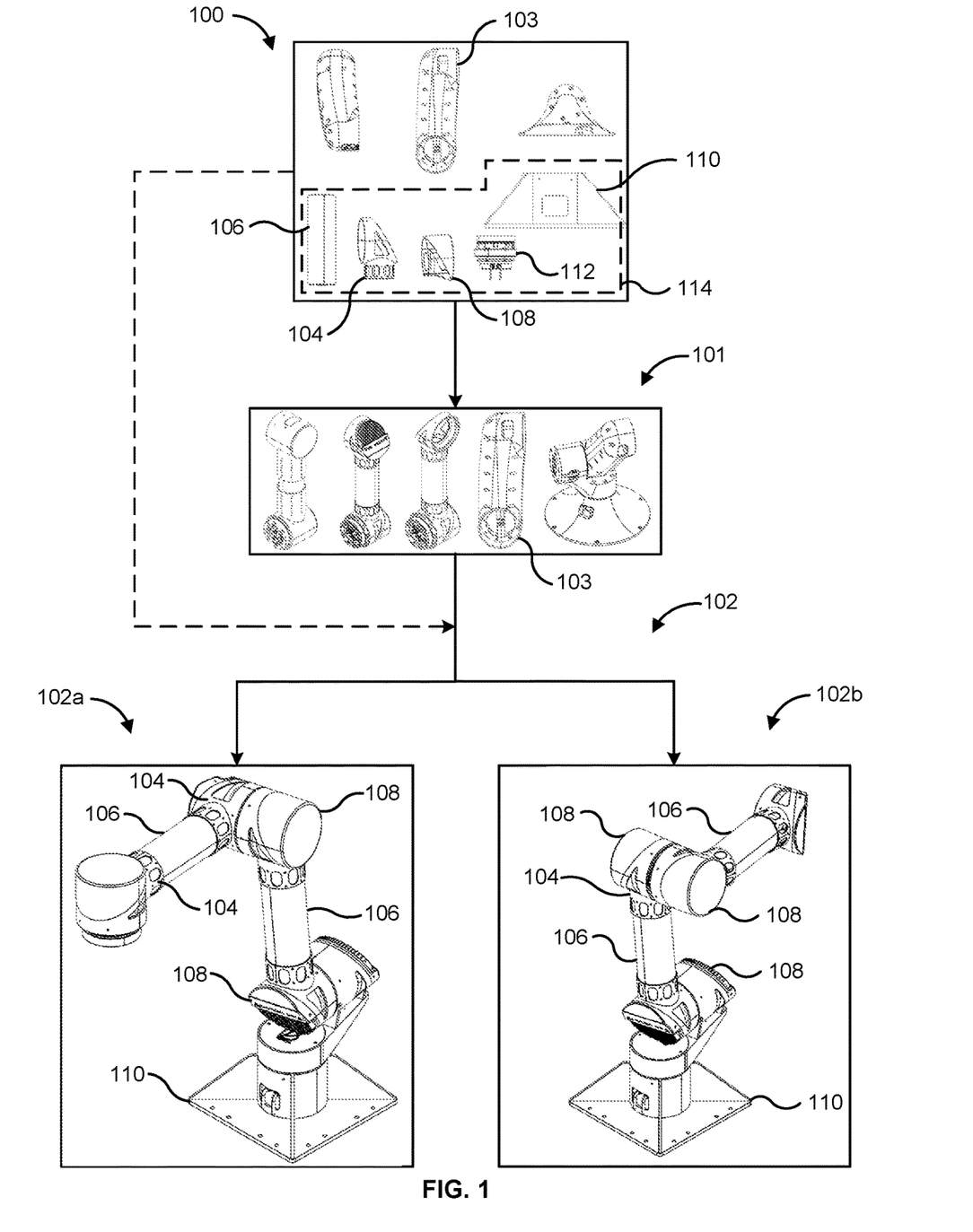
FIG. 1 are example components and example modules for use in building example robotic manipulators, according to at least one example.

Referring now to the figures in which like-referenced numerals and/or names may refer to like elements, FIG. 1 illustrates components 100 used to build robotic manipulators 102 (e.g., which may include individually identified robotic manipulators 102a and 102b in FIG. 1). The components 100 can be connected or coupled with one another in various combinations to form modules 101 and/or the robotic manipulators 102. For example, the components 100 can be combined with one another to form modules 101 which can be combined together to form the robotic manipulators 102 (e.g., following the progression shown with solid lines in FIG. 1) or the components can be combined together to form the robotic manipulators 102 (e.g., following the dashed line for bypassing a portion of the progression shown with solid lines in FIG. 1). The modules 101 and/or the components 100 can be combined together according to a schematic or plan. The components 100 can be sized and shaped to interface with one another. For example, the components 100 can have interfacing dimensions such that the components can be joined (e.g., to form the modules 101). In some embodiments, the components 100 can be or include rigid or semi-rigid material. For example, the components 100 can be or include metal, plastic, or any suitable material.

The components 100 can be or include different types of components. For example, the components 100 can include a housing 104, a linkage 106, a cover 108, a base 110, an actuator 112, or any suitable type of component. Each type of component 100 can have the same or similar pertinent dimensions (e.g., can be modular components) such that one component of a first type can be replaced by another component of the same type without adjusting the other components 100 of the robotic manipulator 102. For example, one housing 104 can be replaced by another housing 104 without needing to use any additional connectors or components. In some embodiments, the components of the same type can have different non-pertinent dimensions or features. The non-pertinent dimensions can allow some aspects of the robotic manipulator 102 to be changed without needing to completely disassemble or redesign the robotic manipulator 102. For example, a linkage 106 having a first length can be replaced by a linkage 106 having a second different length because the linkages 106 have the same diameter (e.g., have the same pertinent dimension).

As an illustrative example, a housing 104 can have a circular opening with a dimension (e.g., an interfacing dimension) which can receive a cylindrical linkage 106 (e.g., the interior diameter of the circular opening is the same or slightly larger than the exterior diameter of the cylindrical linkage 106.

A subset 114 of the components 100 can be identified and used to assemble modules 101 and/or used to build the robotic manipulators 102. For example, the subset 114 can be identified based on a schematic and/or on the desired function of the robotic manipulator 102. The subset 114 can include one or more types of components 100. The subset 114 can additionally or alternatively include multiple components of each type or multiple components of any of the types. For example, the subset 114 can include five housings 104, two linkages 106, five covers 108, and a base 110. The subset 114 of the components 100 can be combined in one or more ways (e.g., in different orders and/or in different amounts of each type of component) to build the modules 101 and/or the robotic manipulators 102. For example, components 100 of the subset 114 can be combined together to form one or more modules 101. In various embodiments, the components 100 (e.g., the subset 114) can be used to build the robotic manipulators 102. For example, the components 100 can be combined with one another to form the robotic manipulators 102.

The modules 101 can include one or more components 100. For example, component 103 can be a component 100 and component 103 can be a module 101. Additionally or alternatively, the modules 101 can include multiple components 100 combined with one another. In further embodiments, modules 101 can include components 100 combined with modules 101 and/or modules 101 combined with other modules 101. In some embodiments, the modules 101 can be modified based on the schematic and/or the robotic manipulators 102. For example, one or more of the components 100 that make up a module 101 can be removed and replaced with other components 100. Additionally, or alternatively, one or more of the components 100 making up a module 101 can be arranged differently. For example, one or more of the components 100 can be rotated or one or more of the components 100 can be lengthened.

The modules 101 and/or the components 100 can be combined in a first way to build a first robotic manipulator 102*a* and can be combined in a second way to build a second robotic manipulator 102*b*. The first and second robotic manipulators 102*a*, 102*b* can perform the same, similar, or different functions. For example, the first and second robotic manipulators 102*a*, 102*b* can perform the same function (e.g., interacting with an item). In some embodiments, some or all of the modules 101 and/or components 100 of the first robotic manipulator 102*a* can be removed and used to build the second robotic manipulator 102*b*. However, the second robotic manipulator 102*b* can be built using different modules 101 and/or components 100 than those used to build the first robotic manipulator 102*a*. Additionally or alternatively, one or more of the modules 101 can be modified (e.g., to change how the robotic manipulator 102*a* moves and/or operates). For example, a cover 108 can be removed from a module 101 that makes up at least a portion of the robotic manipulator 102 and replaced with a different cover 108 from the subset 114 or from the components 100 not in the subset 114.

In further embodiments, one or more of the components 100 and/or modules 101 can include electronics (e.g., a controller). The electronics can include information about the components 100, the modules 101, and/or the locations of the components 100 and/or the modules 101 (e.g., the location of the components 100 relative to one another). The electronics can communicate with one another (e.g., via a wired or wireless connection) to communicate information about the components 100 and/or to provide electrical power to the components 100.

The robotic manipulator 102 may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects).

In some embodiments, depending on the function of the robotic manipulator 102, the robotic manipulator 102 can include an end effector. The end effector can manipulate various items. For example, the end effector can grasp an item and move the item. Example categories of end effectors include: soft robotic end effectors, vacuum end effectors, electro-adhesion end effectors, and mechanical or electro-mechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

Figure 2:
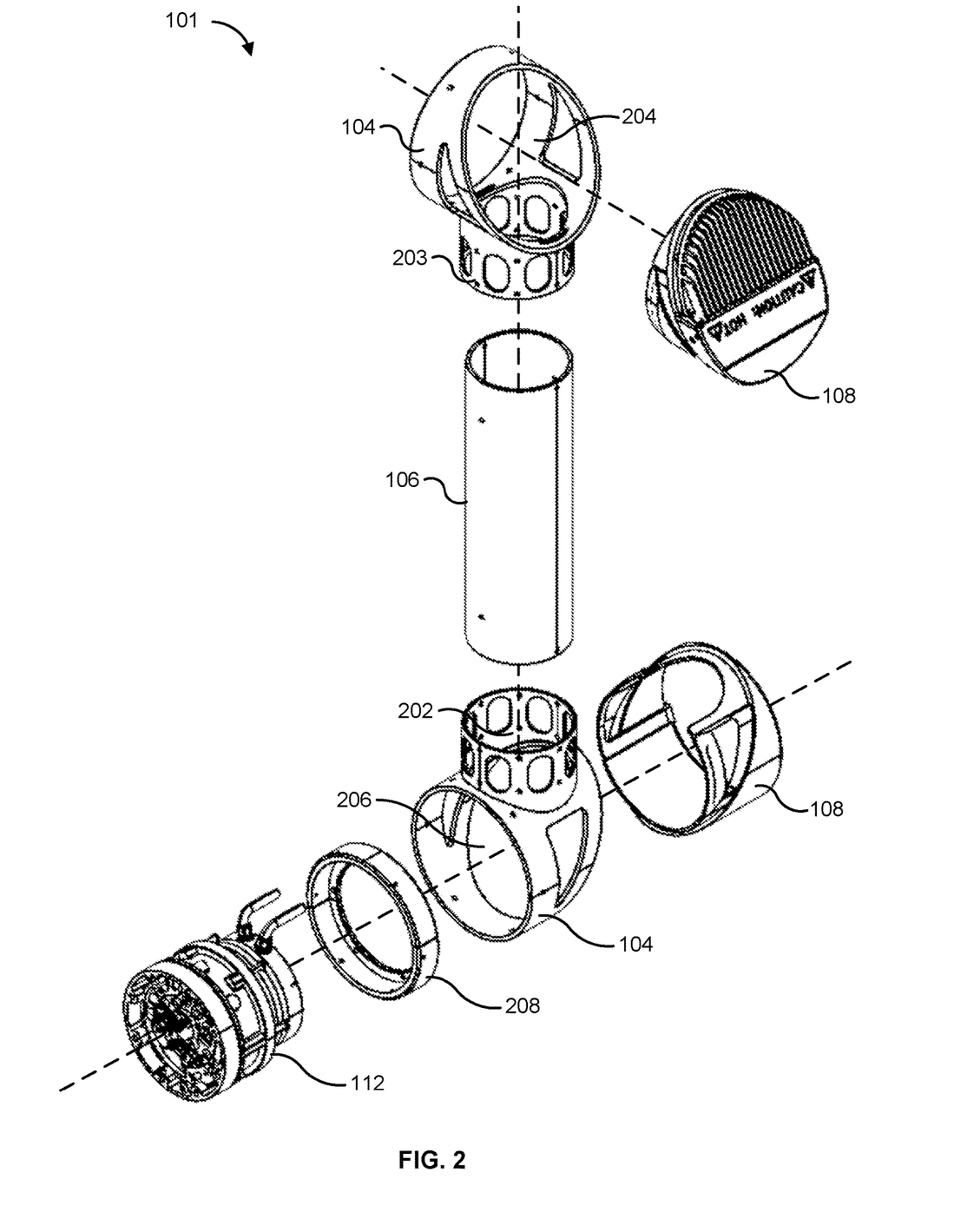
FIG. 2 is an exploded view of an example module including example components of FIG. 1, according to at least one example.

Turning to FIG. 2, an exploded view of an example module 101 including various components 100 is shown. The module 101 in FIG. 2 includes housings 104, a linkage 106, a cover 108, and an actuator 112, however, the module 101 can include additional and/or alternative components or may be assembled with the components combined in a different order or with different orientations. The components of the module 101 can be connected (e.g., coupled or combined) together to form the module 101. The components of the module 101 can be connected using fasteners, snap-fit connectors, adhesives, snaps, hook and loop connectors, or any suitable connector or coupling technique.

The housing 104 can be or include a structure with multiple openings for connecting to the other components. A first opening 202 can include a structure (e.g., can be partially or fully surrounded by a structure) which can connect to the linkages 106. For example, the first opening 202 can be or include a collar 203 which can receive a portion of the linkage 106. The first opening 202 can include interfacing dimensions which correspond to the interfacing dimensions of the linkages 106. For example, the opening 202 can be a circular opening with an inner interfacing diameter that corresponds to the outer interfacing diameter of a cylindrical linkage 106.

The collar 203 and the linkage 106 can include openings for fasteners. For example, the openings in the collar and the linkage 106 can be aligned and a fastener can be put through the collar 203 and the linkage 106. As discussed further in reference to FIGS. 10 through 13, the collar and the linkage 106 can include multiple fastener opening that can allow the housing 104 to be moved relative to the linkage 106.

A second opening 204 can be used to connect the housing 104 with the cover 108. The second opening 204 can receive a portion of the cover 108, for example, as part of a snap fit. The second opening 204 can allow the cover 108 to be removed and replaced. For example, the cover 108 can be unsnapped and removed and a second cover 108 can be attached. The interfacing dimensions of the second opening 204 can correspond to the interfacing dimensions of the cover 108, another housing 104, or any interfacing dimensions of any of the other components 100.

A third opening 206 can be used to connect the housing 104 with other components. For example, the third opening 206 can be used to connect the housing 104 with a linkage 106, another housing 104, a cover 108, or an actuator 112. The third opening 206 can include interfacing dimensions which correspond to the interfacing dimensions of the other components 100.

In some embodiments, the third opening 206 can receive an adapter 208 which can be used to couple the housing 104 with the other components. The adapter 208 can be used to decrease or increase the diameter of the third opening 206 to accommodate components that respectively have a smaller or larger diameter than the third opening 206. For example, the adapter 208 can be used to receive the actuator 112 in the third opening 206. In further embodiments, the adapter 208 can extend out of the housing 104 (e.g., via the third opening 206). The portion of the adapter 208 that extends out of the housing 104 can be used to connect one housing 104 with another housing 104, for example.

The linkages 106 can be or include a structure which can connect two components together. For example, the linkages 106 can be used to connect two housings 104 together (e.g., one housing connected to each end of the linkage 106). In some embodiments, the linkages 106 are cylindrical structures, however, the linkages 106 can be any suitable shape.

The covers 108 can be or include structures which cover one or more of the openings 202, 204, 206. As discussed further in reference to FIGS. 8 through 9, the covers 108 can include openings for connectors and/or features for electronics.

The actuators 112 can move the components. For example, the actuators 112 can be or include a rotational actuator to rotate the components, a linear actuator which can extend in a linear direction, and/or another suitable motor or actuator. In some embodiments, the actuators 112 can connect to the end effector for movement of the end effector and/or to cause the end effector to move. In some embodiments, the actuators 112 may include some or all of the structure of the end effector.

In various embodiments, one or more of the components used to build the robotic manipulator 102 can include channels through which wires or other conduits can be routed. For example, wires can extend through the connected components (e.g., the modules 101) to provide power and/or communicate data between the components and/or the modules 101. As an illustrative example, wires can extend from the actuator 112 into the third opening 206 of the housing 104, out of the first opening 202, and through the linkage 106. In some embodiments, one or more of the components can include connectors for electrically connecting the components. For example, when the components are assembled into a module 101, the connectors can be connected to provide power and/or transmit data to and/or from the components and/or the module 101. In some embodiments, components may include suitable conduits and/or connectors for networks relevant to other mediums, such as air or other gases (e.g., for suction, pneumatics, or other purposes), or water or other fluids (e.g., for coolant, hydraulics, or other purposes), or other substances (e.g., such as for printing or other depositing functions, or other purposes).

In some embodiments, a single type of module 101 can be made at least in part by another type of module 101. One example of such functionality is described below with respect to FIGS. 3 and 4.

Figure 3:
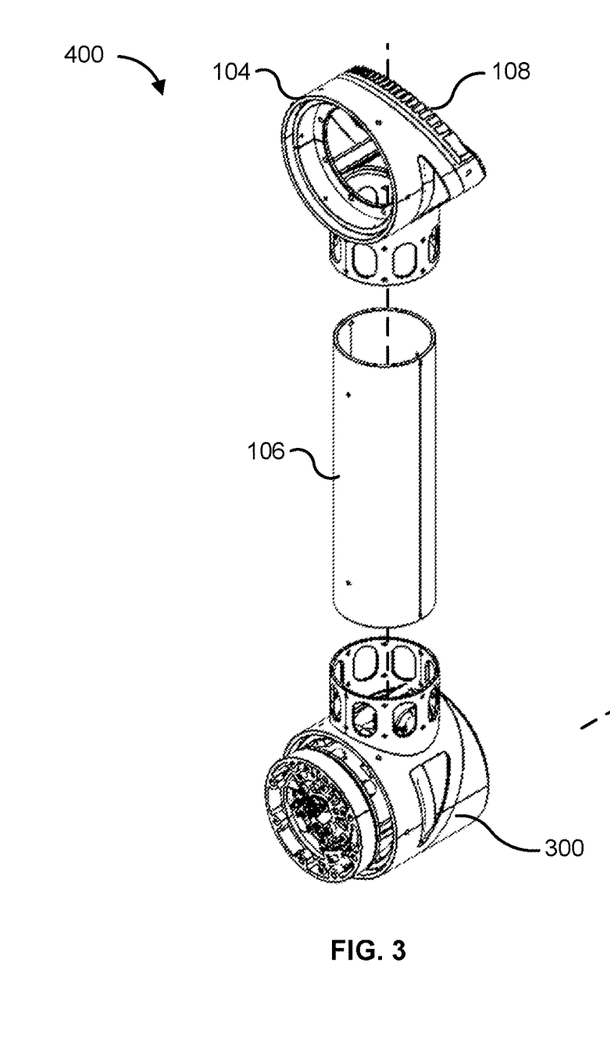
FIG. 3 is an exploded view of another module, according to at least one example.
Figure 4:
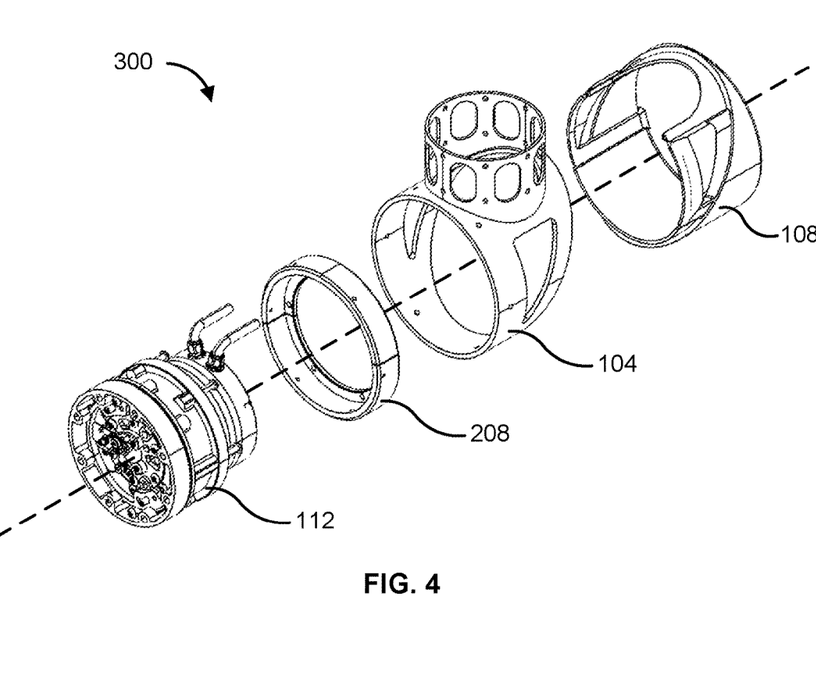
FIG. 4 is an exploded view of a portion of the module of FIG. 3, according to at least one example.

As shown in FIGS. 3 and 4, the module 300 can be assembled and used to build at least a portion of the module 400. The modules 300 and/or 400 can be examples of modules 101 made using components 100. The modules 300 and/or 400 can be made using components 100 included in the subset 114 of components 100 (e.g., identified by the schematic to be used in building the robotic manipulator 102). In an illustrative example, the module 300 can include an actuator 112, an adapter 208, a housing 104, and a cover 108. As shown in FIG. 3, the module 300 can be combined with other components and/or other modules 101 to build the module 400. The modules and/or components that make up module 400 can be changed to change the function of the module 400 and/or the robotic manipulators 102. For example, a module 300 which includes an actuator 112 can be removed and replaced with a different module 101 having a different actuator 112 to change the function of the module 400 and/or the robotic manipulator 102. Additionally or alternatively, individual components of module 400 can be added, removed, or re-oriented to modify the module 400.

Figure 5:
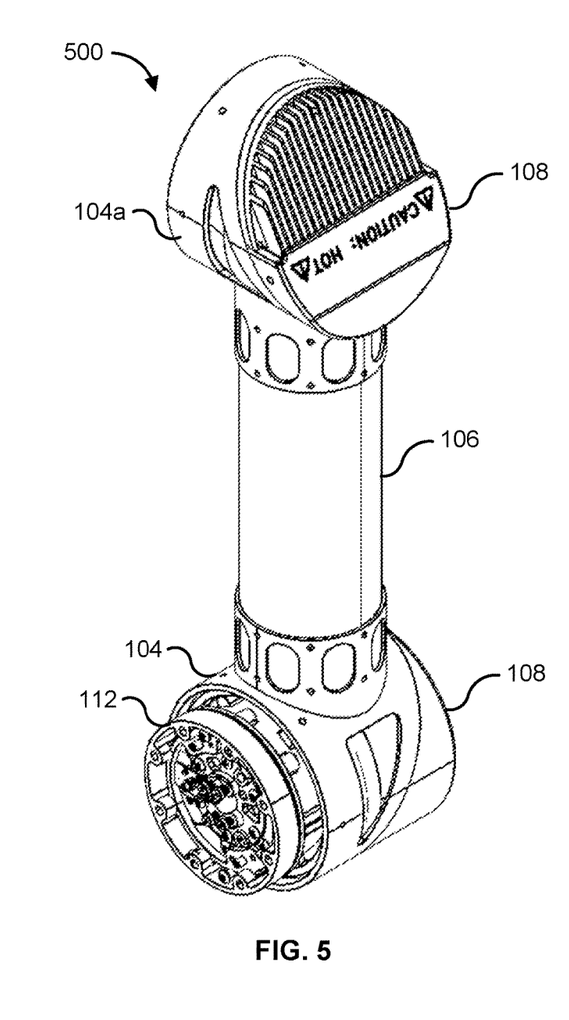
FIGS. 5 through 7 include example modules with changing components, according to at least one example.
Figures 6, 7:
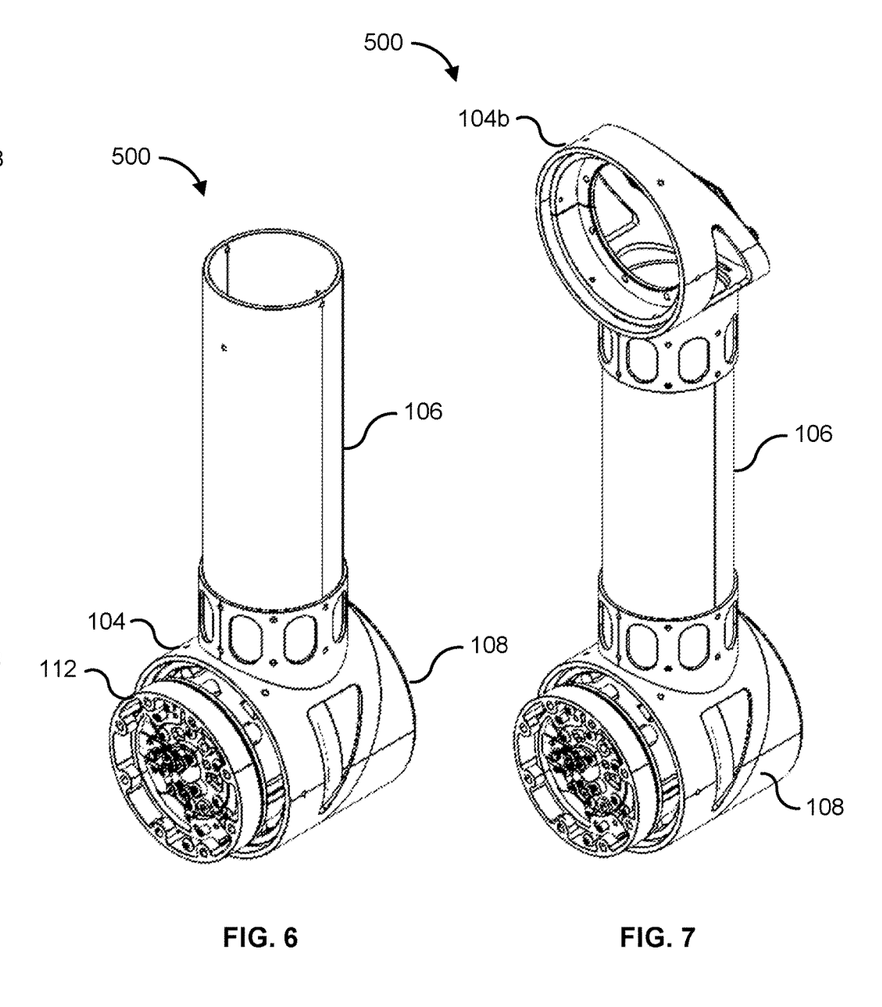

Turning to FIGS. 5 through 7, a process of replacing the components 100 of a module 500 is shown. The module 500 can be or include any of the modules 101, 300, or 400 described herein. The module 500 includes two housings 104, two covers 108, a linkage 106, and an actuator 112. FIG. 5 shows the module 500 after it has been assembled. FIG. 6 shows the module 500 after a housing 104a and a cover 108 have been removed. The housing 104a and the cover 108 can be removed, for example, by detaching the housing 104a from the linkage 106 and removing the housing 104a and cover 108 while they are still connected. However, the housing 104a and the cover 108 can be removed as individual pieces. Removing the housing 104a and the cover 108 leaves one end of the linkage 106 open. FIG. 7 shows an example of how another housing 104b can be positioned on the open end of the linkage 106. The housing 104b can be attached to the linkage 106, for example, using fasteners. The housing 104b can be positioned on the linkage 106 with the same orientation as the housing 104a or at a different orientation than the housing 104b. The cover 108 previously used with the housing 104a can be coupled with the housing 104b or a different component can be attached to the housing 104b.

Figure 8:
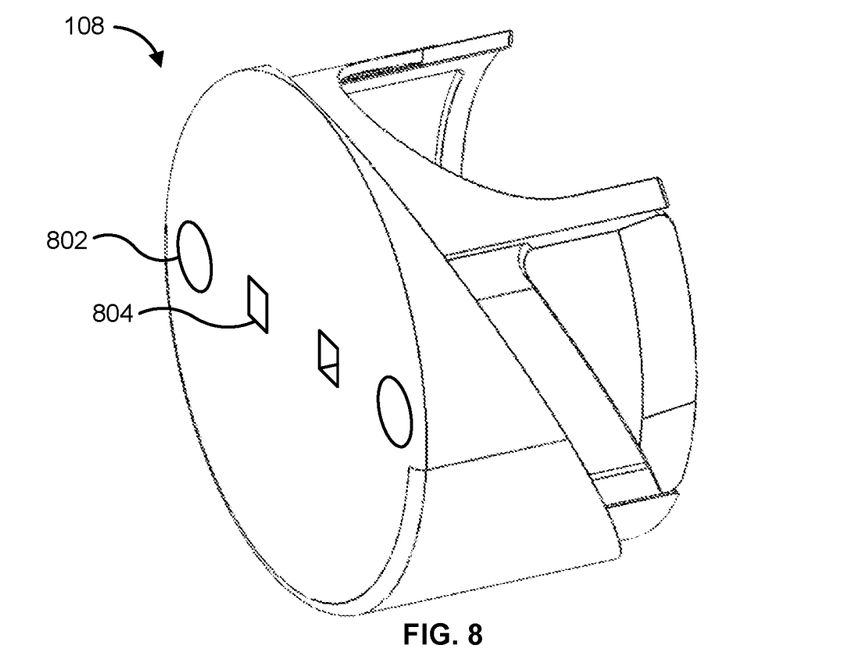
FIGS. 8 through 9 include components for use with the modules, according to at least one example.
Figure 9:
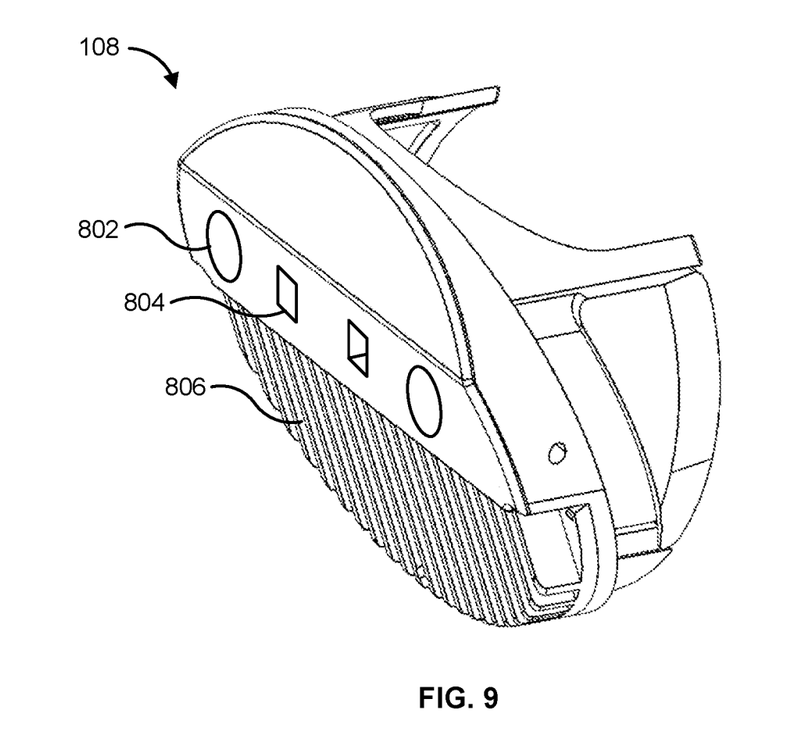

Turning to FIGS. 8 and 9, different examples of covers 108 for use with the modules 101 and/or the robotic manipulator 102 are shown. FIG. 8 shows a first cover 108 which includes openings 802. The openings 802 can allow wires, hoses, or other conduits to extend through the cover 108. The openings 802 can be or include pass-through passages and/or can be or include quick connectors to allow the hoses or other conduits to connect to the openings 802. The quick connectors can allow for a connection of a tube, hose, or electronic cable using a locking collet that receives a fitting, for example. The quick connect can allow for connection of the tube, hose, or electronic without needing to screw or otherwise mechanically secure the connection beyond inserting the fitting in the locking collet. The quick connectors can be or include push-to-connect, push-fit, or other types of fittings (which may include commercially available fittings known as SharkBite fittings for example). In various embodiments, the openings 802 can be or include conduits and/or connectors for networks relevant to other mediums, such as air or other gases (e.g., for suction, pneumatics, or other purposes), or water or other fluids (e.g., for coolant, hydraulics, or other purposes), or other substances (e.g., such as for printing or other depositing functions, or other purposes).

In some embodiments, the cover 108 can include connector ports 804 which can receive connectors. The connector ports 804 can be or include wire-to-wire connectors, cable-to-wire connectors, and/or cable-to-cable connectors. The connector ports 804 can allow one or more components of the robotic manipulator 102 to receive power and/or send or receive data or other mediums. For example, a controller can have a connector which plugs into the connector port 804 which can send data to one or more components of the robotic manipulator 102. FIG. 9 shows a cover 108 including features for heat dissipation. For example, the cover 108 can include heat sink 806 which can aid in removing heat from the cover 108. The heat sink 806 can remove heat from electronic devices connected to the housing 104. For example, a controller can be connected to the housing and the heat sink 806 can remove heat to prevent the controller from overheating.

Figure 10:
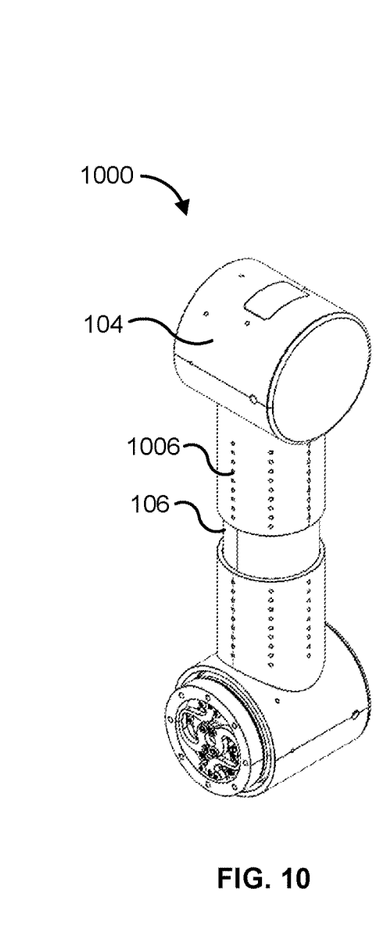
FIGS. 10 through 13 include a module with components in different positions, according to at least one example.
Figure 11:
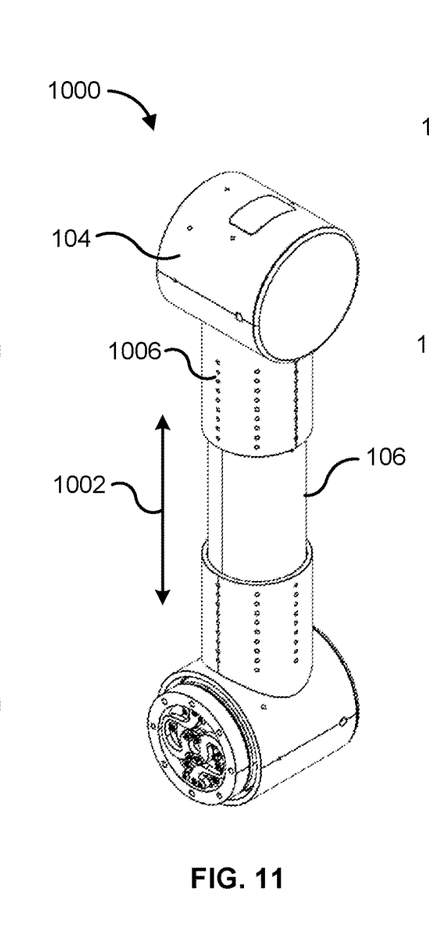
Figure 12:
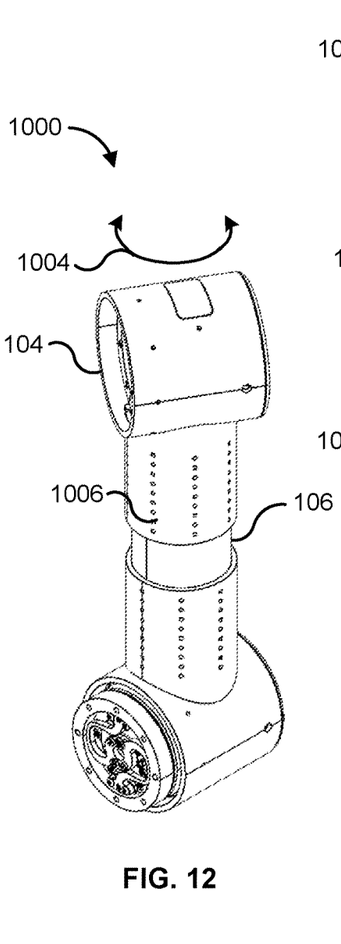
Figure 13:
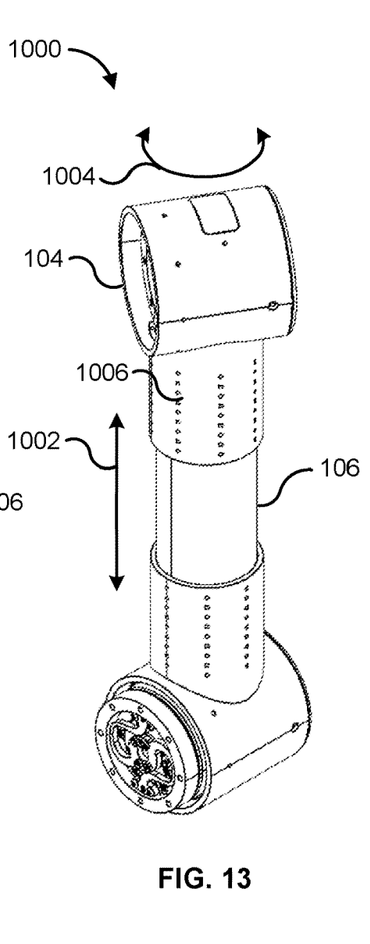

Turning now to FIGS. 10 through 13, examples of how the components of a module 1000 can be rotated and moved are shown. Module 1000 can be an example of modules 101, 300, 400, or any of the modules discussed herein. FIG. 10 shows the module 1000 in a first position with the housing 104 in a first orientation. The housing 104 can be attached to the linkage 106 with fasteners extending through openings 1006. The openings 1006 can be through-holes and/or can include features to aid in the securing of the fasteners. For example, openings 1006 can be threaded or can include other securing mechanisms. Some or all of the openings 1006 can align with openings in the linkages 106. For example, the openings 1006 can be aligned with the opening of the linkages, for example, after the housing 104 has been translated and/or rotation (e.g., as shown in FIGS. 11 through 13).

FIG. 11 shows the module 1000 after the housing 104 has been translated along the linkage 106 in direction 1002. The housing 104 can be moved by removing and/or loosening the fasteners connecting the housing to the linkage 106 and translating the housing 104 along the linkage 106. The fasteners can then fix the housing 104 in the new position (e.g., by extending through the openings 1006 and/or the openings in the linkage 106. FIG. 12 shows the module 1000 after the housing 108 has been rotated. The housing 104 can be rotated along direction 1004. The fasteners can be removed and/or loosened prior to rotation of the housing 104 and used to fasten the housing 104 in position after rotation. FIG. 13 shows how the housing 104 can be rotated and translated along the linkage 106.

Figure 14:
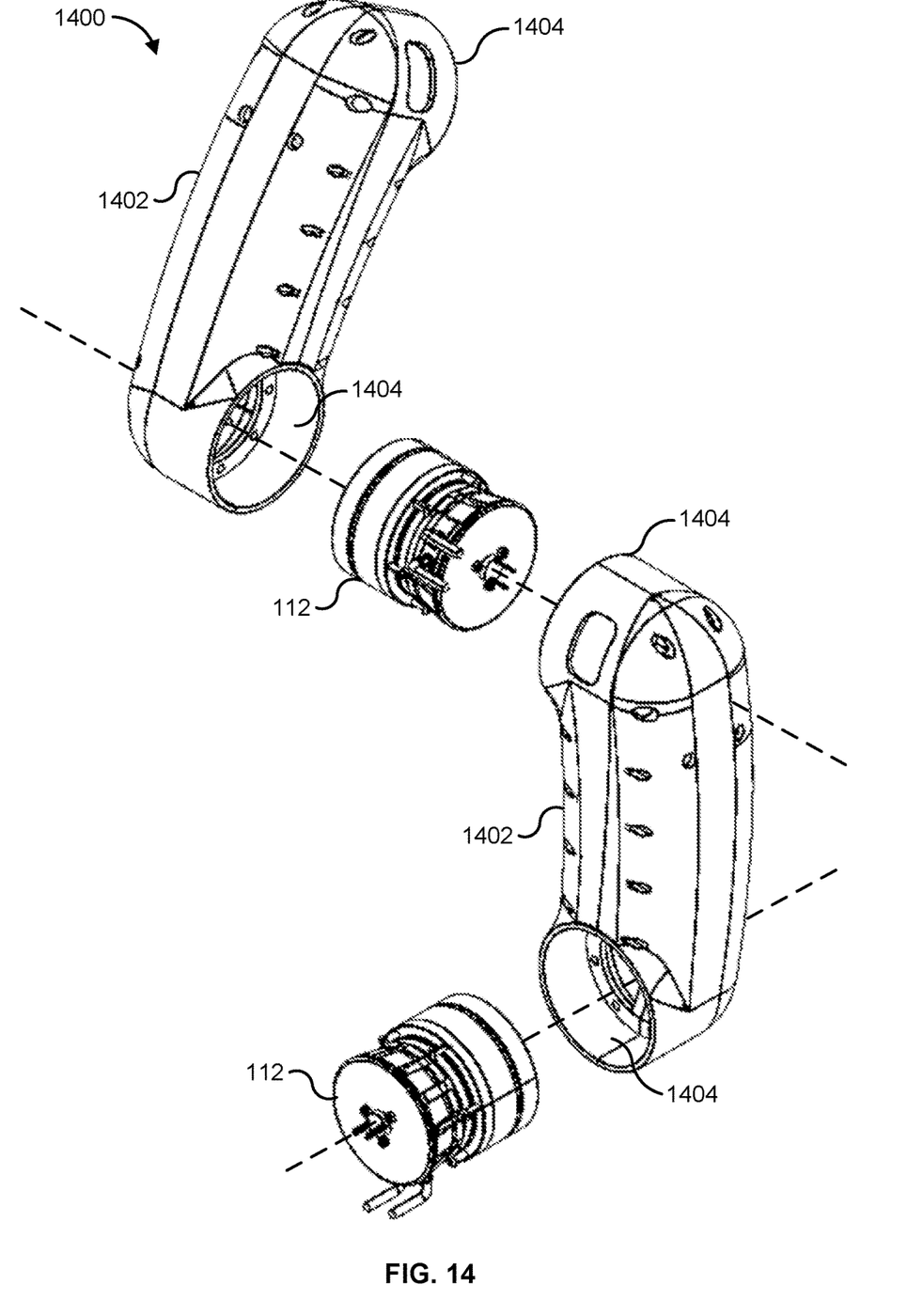
FIG. 14 includes an exploded view of an additional module, according to at least one example.

Turning to FIG. 14, an exploded view of another module 1400 is shown. The module 1400 can include structural components 1402 and actuators 112. The structural components 1402 can be or include components 100 and/or can be or include modules 101. The structural components 1402 can include openings 1404 which can receive the actuators 112. The structural components 1402 can be designed and/or built based on the function of the module 1400 and/or the robotic manipulator 102 that uses the module 1400. For example, the orientation of each of the openings can be determined based on the function of the robotic manipulator 102 and/or the module 1400, before the structural components 1402 are built. Various dimensions (e.g., non-pertinent dimensions) of the structural components 1402 can additionally or alternatively be adjusted (e.g., the length of the structural components 1402 can be adjusted based on the desired functionality of the module 1400). The structural components 1402 can then be assembled to build the module 1400. In various embodiments, the structural components 1402 can be 3D printed based on the desired function of the module 1400. The structural components 1402 can be or include plastic, metal, rubber, or any suitable rigid or semi-rigid material.

Figure 15:
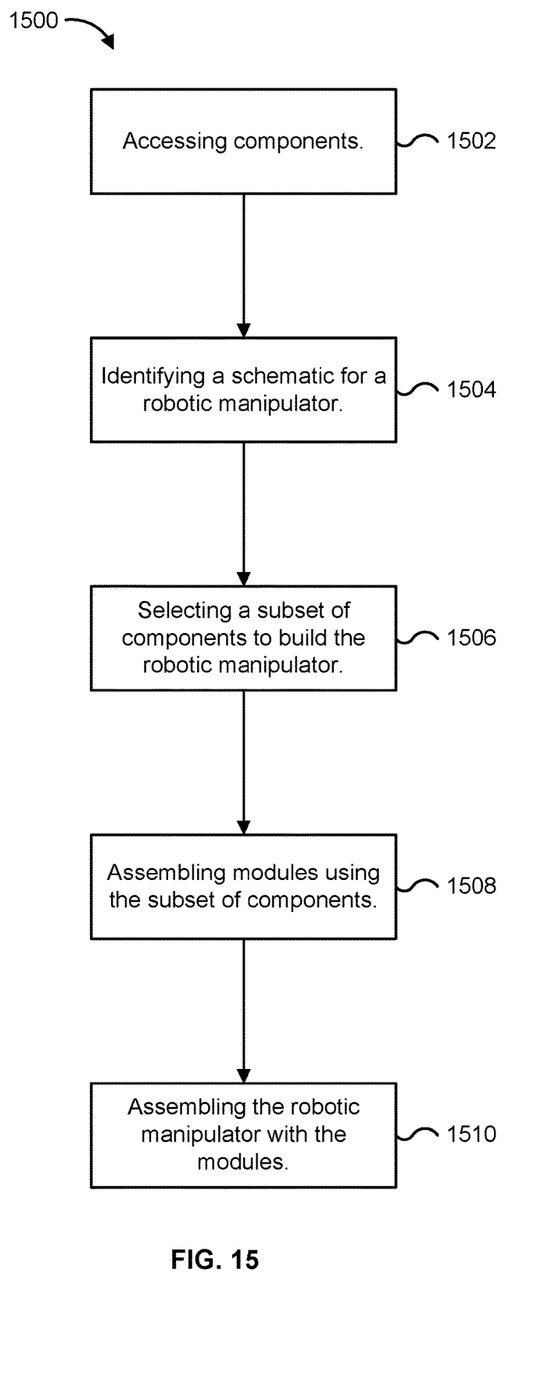
FIG. 15 is a flow diagram depicting an example process for constructing a robotic manipulator as described herein, according to at least one example.

FIG. 15 is a flowchart illustrating a process 1500 for building a robotic manipulator 102 using components 100. Various blocks of the process 1500 are described by referencing blocks 1602 through 1610 of FIG. 16, however, additional and/or alternative components may be used with the process 1500. The process 1500 can be completed in the order shown (e.g., 1502 through 1508), however, the process 1500 may be completed in any order and/or various blocks may be repeated (e.g., the process 1500 can go from block 1506 to block 1510).

Figure 16:
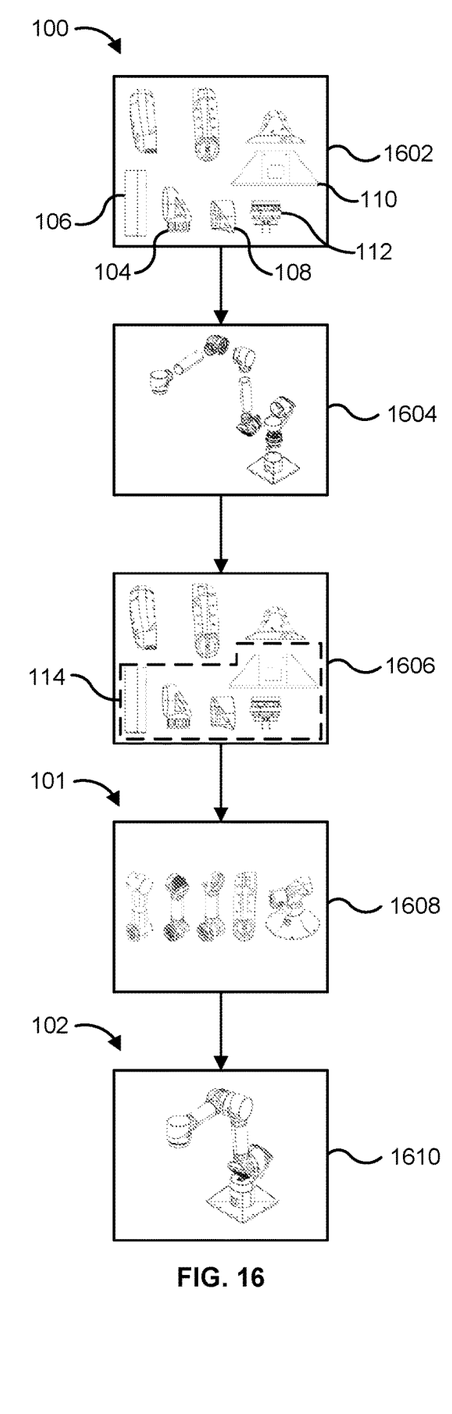
FIG. 16 illustrates various states of components that may be implemented in the example process of FIG. 15, according to at least one example.

The process 1500 at block 1502 can include accessing components (e.g., components 100). The components 100 can include different types of components suitable for building a robotic manipulator (e.g., robotic manipulator 102). FIG. 16 at block 1602 shows an example of various components which can be used to build the robotic manipulator 102. For example, the components 100 can include a housing 104, a linkage 106, a cover 108, a base 110, or an actuator 112.

The process 1500 at block 1504 can include identifying a schematic for the robotic manipulator 102. The schematic can be identified based on the desired function of the robotic manipulator 102 and/or the components 100 or modules 101 available to build the robotic manipulator 102. The schematic can include plans (e.g., a design) of the robotic manipulator 102. For example, the schematic can include instructions on how the components 100 can be combined together to build the modules 101 and how the modules 101 and/or the components can be combined to form the robotic manipulator 102. FIG. 16 at block 1604 shows an example schematic which shows modules 101 and components 100 which can be used to build the robotic manipulator 102. However, the schematic can show just modules 101, just components 100, or a combination of modules 101 and components 100. The schematic as shown in block 1604 includes one combination of modules 101 and components 100, however, the schematic can include plans for how to combine the components 100 and modules 101 in multiple different ways. For example, the schematic can include how the components 100 and modules 101 can be ordered and/or the different types of components 100 and modules 101 and how many of each type can be used to build the robotic manipulator 102. The schematic can additionally or alternatively include designs and/or instructions for creating modules 101. For example, the schematic can include designs and/or instructions for 3D printing modules 101 and/or components 100.

The process 1500 at block 1506 can include selecting a subset (e.g., subset 114) of components 100 to build the robotic manipulator 102. FIG. 16 at block 1606 shows the subset 114 of the components 100. The subset 114 of components 100 can be selected based on the schematic. For example, the subset 114 can include components 100 which can be used to build the robotic manipulator 102.

The process 1500 at block 1508 can include assembling modules (e.g., modules 101) using the subset 114. FIG. 16 at block 1608 shows various modules 101 that can be used to build the robotic manipulators 102. The modules 101 can include one or more components 100. For example, the modules 101 can include components 100 combined together. However, respective modules 101 can consist of a single component 100 or multiple components 100. In various embodiments, modules 101 that are already built can be modified based on the schematic. For example, existing modules 101 can be modified by replacing components 100 and/or changing lengths of components 100 and/or orientations of components 100.

The process 1500 at block 1510 can include assembling the robotic manipulator 102 with the modules 101 and/or the components 100. FIG. 16 at block 1610 shows the assembled robotic manipulator 102. The assembled robotic manipulator 102 can be assembled based on a combination from the schematic. For example, the robotic manipulator 102 can be assembled by connecting the modules 101 and/or components 100 in an order identified in the schematic. In various embodiments, the robotic manipulator 102 can be assembled using modules 101 and/or components 100 from a different robotic manipulator 102. For example, modules 101 and components 100 of a first robotic manipulator 102 can be used to build a second robotic manipulator 102. The second robotic manipulator 102 may be built using additional modules 101 and/or components 100.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of assembly of a robotic manipulator, comprising:
accessing modular components couplable with one another and combinable in different combinations to produce different types of modules;
identifying a schematic associated with the robotic manipulator capable of performing a material handling function in a logistics operation environment, the schematic indicating a subset of modular components capable of being assembled in a plurality of combinations to form modules capable of being assembled to form the robotic manipulator;
selecting the subset of modular components from the modular components based on the identified schematic, wherein components of the subset of modular components are configured to snap-fit to each other, wherein the subset of modular components comprises:
a housing comprising a first tubular portion and a second tubular portion intersecting perpendicularly and integrally formed with the first tubular portion, wherein the first tubular portion defines a collar including a first opening, and the second tubular portion defines a second opening and a third opening that are coaxial, wherein the second opening has an angled periphery, wherein each of the first, second, and third opening extends into a hollow interior to allow routing wires or conduits to pass through and between at least one of the first opening, the second opening, or the third opening,
a cover with a cover opening and couplable at the second opening, wherein an orientation of the cover is restricted by the angled periphery of the second opening or a cutout engageable with the first tubular portion of the collar, wherein the cover opening allows access to the wire or the conduit through the cover opening,
a linkage configured to couple external to the collar and allow access to the wires or the conduits through the linkage,
an actuator receivable through the third opening, and
an adapter configured to receive the actuator and snap-fit within the third opening,
assembling the modules by snap-fitting the modular components of the subset of modular components based on the schematic associated with the robotic manipulator; and
assembling the robotic manipulator by coupling the modules with one another in accordance with one of the plurality of combinations of the identified schematic such that the wires or the conduits can be passed from the linkage to the actuator through the housing.

2. The method of claim 1, further comprising:
identifying a second schematic associated with a second robotic manipulator based on the modules, the second schematic containing the modules capable of being assembled in a second plurality of combinations to form the second robotic manipulator; and
assembling the second robotic manipulator by coupling the modules with one another in accordance with one of the combinations of the plurality of second combinations of the identified second schematic.

3. The method of claim 1, further comprising:
assembling a second robotic manipulator by coupling the modules with one another in accordance with another of the plurality of combinations of the schematic.

4. The method of claim 1, further comprising:
identifying a second schematic associated with a second robotic manipulator, the second schematic containing a second subset of modules capable of being assembled in a plurality of combinations to form the second robotic manipulator; and
assembling the second robotic manipulator by coupling the modules with one another in accordance with one of the plurality of combinations of the identified second schematic.

5. A method comprising,
accessing modules couplable with one another and combinable in different combinations to produce different types of robotic manipulators;
identifying a schematic associated with a robotic manipulator, the schematic indicating a subset of modules capable of being assembled to form the robotic manipulator, wherein components of the subset of modules are configured to snap-fit to each other, wherein the subset of modules comprises:
a housing comprising a first tubular portion and a second tubular portion intersecting perpendicularly and integrally formed with the first tubular portion, wherein the first tubular portion defines a collar including a first opening, and the second tubular portion defines a second opening and a third opening that are coaxial, wherein the second opening has an angled periphery, wherein each of the first, second, and third opening extends into a hollow interior to allow routing wires or conduits to pass through and between at least one of the first opening, the second opening, or the third opening,
a cover with a cover opening and couplable at the second opening, wherein an orientation of the cover is restricted by the angled periphery of the second opening or a cutout engageable with the first tubular portion of the collar, wherein the cover opening allows access to the wire or the conduit through the cover opening,
a linkage configured to couple external to the collar and allow access to the wires or the conduits through the linkage,
an actuator receivable through the third opening, and
an adapter configured to receive the actuator and snap-fit within the third opening,
assembling the robotic manipulator by snap-fitting the subset of modules with one another in accordance with the identified schematic such that the wires or the conduits can be passed from the linkage to the actuator through the housing.

6. The method of claim 5, wherein the subset of modules are capable of being assembled in a second combination, the method further comprising assembling a second robotic manipulator by coupling the modules with one another in accordance with the second combination.

7. The method of claim 5, further comprising:
accessing components couplable with one another and combinable in different combinations to produce different types of modules; and
assembling the modules by coupling the components based on the schematic.

8. The method of claim 7, wherein the components comprise electric pathways and assembling the modules comprises coupling the electric pathways of the components.

9. The method of claim 8, wherein the electric pathways are configured to transmit electrical signals or data between the modules.

10. The method of claim 5, further comprising identifying a second schematic associated with a second robotic manipulator based on the subset of modules, wherein the subset of modules are capable of being assembled to form the second robotic manipulator in accordance with the second schematic.

11. The method of claim 10, further comprising assembling the second robotic manipulator by coupling the subset of modules with one another in accordance with the second schematic.

12. The method of claim 5, further comprising identifying a second schematic associated with a second robotic manipulator, the second schematic containing a second subset of modules capable of being assembled to form the second robotic manipulator; and selecting the second subset of modules based on the identified second schematic.

13. The method of claim 1, wherein the collar is couplable to one of a first modular component, a second modular component or another modular component of the subset of the modular components.

14. The method of claim 1, wherein the linkage is a hollow tube.

15. The method of claim 14, wherein the linkage is configured to have an adjustable length to length or shorten the robotic manipulator.

16. The method of claim 1, wherein the cover comprises a heat sink to remove heat generated within the housing.

* * * * *